United States Patent [19]
Cook et al.
[11] Patent Number: 4,908,154
[45] Date of Patent: Mar. 13, 1990

[54] METHOD OF FORMING A MICROEMULSION

[75] Inventors: Edward J. Cook, South Hamilton; Arthur P. Lagace, Newtonville, both of Mass.

[73] Assignee: Biotechnology Development Corporation, Newton, Mass.

[21] Appl. No.: 58,697

[22] Filed: May 26, 1987

Related U.S. Application Data

[63] Continuation of Ser. No. 255,239, Apr. 17, 1981, abandoned.

[51] Int. Cl.[4] .............................................. B01J 13/00
[52] U.S. Cl. ........................................ 252/314; 44/51; 106/287.14; 252/312; 426/602; 426/650; 514/938; 514/939; 524/836
[58] Field of Search ................................ 252/312, 314

[56] References Cited

U.S. PATENT DOCUMENTS

| | | | |
|---|---|---|---|
| 1,496,858 | 6/1924 | Knollenberg | 252/314 |
| 1,593,762 | 7/1926 | Heitmann | 252/312 |
| 2,068,136 | 1/1937 | Hulbert | 252/314 X |
| 2,584,805 | 2/1952 | Leftwich | 252/312 X |
| 2,882,025 | 4/1959 | Loo | 366/340 |
| 3,941,552 | 3/1976 | Cottell | 431/2 |
| 4,081,863 | 3/1978 | Rees | 366/176 |
| 4,336,147 | 6/1982 | Stayner | 252/49.5 |
| 4,337,161 | 6/1982 | Stayner | 252/49.5 |

FOREIGN PATENT DOCUMENTS

| | | | |
|---|---|---|---|
| 904996 | 9/1962 | United Kingdom | 252/312 |

OTHER PUBLICATIONS

Sutheim: Introduction to Emulsions, Chemical Publishing Co., Inc., Brooklyn, N.Y., 1946, pp. 158 and 159.
Kirshner: *Fluid Amplifiers,* Chapter 10, pp. 51–54, McGraw Hill, 1966.
Mayheim et al.: "Characterization of Liposomes Produced by Microfluidization", Contributed Papers Poster Session, Amer. Pharmaceutical Ass'n., Academy of Pharmaceutical Sciences, Philadelphia, Pa., Oct. 31, 1984.
Mayhem et al.: "Characterization of Liposomes Prepared Using a Microemulsifier", Biochimica et Biophysica Acta., 775, (1984), 169–174.
Siciliano: "Microfluidization—A New Process for the Production of Fine Emulsions, Dispersions and Liposomes", Contributed Paper-Poster/Podium Session, Society of Cosmetic Chemists, Annual Meeting, Dec. 1984.
Korstvedt et al., "Microfluidization", D&Cl/Nov. 1984, pp. 36, 38 and 40.
Gaulin Industrial Homogenizers, Pumps and Colloid Mills, pp. 1–23.
Mulder, H. and Walstra, P., The Milk Fat Globule Emulsion Science as Applied to Milk Products and Comparable Foods, 1974, pp. 162–169.

*Primary Examiner*—Richard D. Lovering
*Attorney, Agent, or Firm*—Schiller, Pandiscio & Kusmer

[57] ABSTRACT

Method and apparatus for forming emulsions, a term used to include microemulsions. The leading edges of a plurality of sheets of an emulsion-forming liquid mixture are forced under pressure to impinge in a low-pressure turbulent zone of the liquid. The apparatus comprises a plurality of nozzles having elongated orifices to eject under pressure sheets of the emulsion-forming liquid and being arranged to effect impingement of the sheets along a common liquid jet interaction front. Inasmuch as the method and apparatus permit the formulation of emulsions without the use of any emulsifiers, there is provided a new class of emulsions, namely those essentially free of any emulsifying agents. The emulsions formed have a wide range of applications.

14 Claims, 10 Drawing Sheets

METHOD OF FORMING A MICROEMULSION

This application is a continuation application of U.S. Ser. No. 255,239 filed Apr. 17, 1981, now abandoned.

This invention relates to a method and apparatus for forming emulsions, a term used to include so-called microemulsions wherein the dispersed phase droplet diameters range between about 100 Å to about 2000 Å (about 0.01 μm to about 0.2 μm). Inasmuch as the method and apparatus of this invention make possible the formation of emulsions which are essentially free of any emulsifiers, it also relates to a new class of emulsions.

Over the past 50 years the uses for emulsions and microemulsions have greatly increased in number; and they now encompass such diverse applications as cosmetics, foods and flavors, pharmaceuticals, cleansing and waxing compositions, reagents in chemical and petroleum processes, coatings, paints and inks, adhesives, tertiary oil recovery and polymer manufacture. More recently, a great deal of attention has been given to incorporating finely divided particulate materials into emulsions. Exemplary of such a system is finely divided coal in a water-in-oil emulsion as a substitute for fuel oil.

The term "emulsion" is used in the art and hereinafter in the description of this invention to designate a system comprising two liquid phases, one of which is dispersed as globules in the other. The two liquids are essentially immiscible and they are generally referred to as constituting a dispersed phase and a continuous phase. In microemulsions the dispersed phase droplets usually have diameters between about 0.01μm and 0.2μm. Depending upon the choice of liquids used for the two phases and the surfactants employed to form the desired system, microemulsions may be oil-in-water, water-in-oil or anhydrous. In these two general classes "water" is used to include any highly polar, hydrophilic liquid and "oil" to include any nonpolar, hydrophobic liquid. Microemulsions may be described as translucent, a term used to include transparent; and, because the interfacial tension between the oil and water phases is essentially zero, they are normally more stable than those emulsions in which the discontinuous phase liquid droplets are larger.

Despite the rapid and continual expansion in the use of emulsions in many different fields, very few advances have been made in methods and apparatus for making them. In prior art techniques, the formulation of emulsions has required subjecting the liquids making up the phases, along with a suitable emulsifier, to high shear forces. This may be done either mechanically or acoustically at ultrasonic frequencies. Most of the mechanical devices operate to force the emulsion-forming mixture through small holes in orifice plates or between a tightly fitting rotor and stator, e.g., in a colloid mill. In ultrasonic emulsifying equipment the acoustical energy is used to produce rapid local variations in the pressure applied to the system to effect cavitation in which high local shear is developed. (See for example "Emulsions and Emulsion Technology" (K. J. Lissant, Ed.) Part 1, pp 103–105, Marcel Dekker, Inc. New York (1974).)

Although basic techniques used for forming emulsions are generally applicable to forming microemulsions, there are significant differences in the mechanisms by which microemulsions are formed. For example, putting more work and/or increasing emulsifier content usually improves the stability of macroemulsions; but this is not necessarily the case for microemulsions when formed by the presently available methods and apparatus. Rather, the microemulsion systems made by present techniques seem to be dependent for their formation upon incompletely understood interactions among the molecules of the two immiscible liquids and the emulsifiers used, upon the choice and amount of emulsifiers (normally two kinds must be combined), as well as upon the choice and relative amounts of the two liquids to be emulsified. According to prior art teaching, microemulsions can not be formed unless the proper match between oil and emulsifier exists. Thus is spite of the wide range of applications now known for microemulsions, present-day methods and apparatus for their formulation severely limit the number and types of oils that can be emulsified; limit the weight percent of oil, relative to the weight of water, that can be incorporated into the microemulsions; and restrict the emulsifiers to those having a certain, as yet undefined, relationship to the oils and water. (See for example "Microemulsions Theory and Practice" (L. M. Prince, Ed) pp 37–46, Academic Press, Inc., New York (1977).) It would, therefore be highly advantageous to have available methods and apparatus which are capable of forming emulsions, including microemulsions, and which are not as restrictive in the choice of either the immiscible liquids or the emulsifier used and which therefore make possible the formulation of new classes of emulsions with newly attainable characteristics and applications.

It is therefore a primary object of this invention to provide an improved method for forming emulsions including microemulsions. It is another object to provide a method of the character described which, when compared with present methods of emulsion formulation, offers more flexibility in the choice and amounts of immiscible liquids used, particularly oils, more flexibility in the choice and amounts of emulsifiers including the elimination of emulsifiers; and alternatives in the manner in which the emulsifiers are added.

A further object of this invention is to provide a method for forming unique classes of emulsions, including microemulsions, e.g., those without emulsifiers, which offer the possibility of their being employed in unique commercial applications and processes.

It is yet another object of this invention to provide a method of forming emulsions having dispersed phase droplets which may be as small as 0.01 μm or less, in diameter. Still a further object is to provide a method of forming emulsions which does not increase the temperature of the emulsion to the extent that serious problems of thermal degradation are encountered. It is also an object to provide such a method which offers improved quality control and better reproducibility of physical characteristics of the emulsion than is now attainable.

An additional object is to provide a method for forming a wide variety of emulsions with diverse properties for diverse uses such as food (including homogenized milk), pharmaceuticals, paints, fuels, industrial chemicals and the like. Another primary object of this invention is to provide an improved apparatus for formulating emulsions, including microemulsions. A further object is to provide apparatus of the character described which makes possible the use of a wider range of types and ratios of immiscible liquids as well as types and quantities of emulsifiers. An additional object is to provide apparatus which makes it possible to formulate emulsions without an emulsifier and to make them with dispersed phase droplets of very small diameters.

A still further object is to provide emulsion-forming apparatus which achieves turbulent jet interaction producing high values of circulation at high fluid processing rates and which is so arranged as to deliver essentially all of the energy supplied to the system within the area of emulsion formation. Yet another object of this invention is to provide apparatus possessing the above characteristics which lends itself to being constructed in a wide range of sizes and which is easy to clean and relatively simple to operate. A further object is to provide such apparatus which can be used to incorporate finely divided particulate materials into an emulsion and to carry out processes other than emulsion formation such as the rupturing of cells or the thorough mixing of miscible liquids.

Other objects of the invention will in part be obvious and will in part be apparent hereinafter.

The invention accordingly comprises the several steps and the relation of one or more of such steps with respect to each of the others, the article of manufacture, and the apparatus embodying features of construction, combinations of elements and arrangement of parts, which are adapted to effect such steps and produce such articles of manufacture, all as exemplified in the following detailed disclosure, and the scope of the invention will be indicated in the claims.

According to one aspect of this invention there is provided a method of forming an emulsion, characterized by the step of forcing under pressure the leading edges of a plurality of thin sheets of equal thickness of an emulsion-forming liquid system to impinge along a common interaction front in a zone of the liquids.

According to another aspect of this invention there is provided a method of forming an emulsion, comprising the steps of ejecting under pressure a liquid emulsion-forming mixture through a plurality of elongated nozzles to form a plurality of thin sheets of the liquid mixture; and causing the thin sheets of the liquid mixture to impinge along a common liquid jet interaction front in a zone of the liquid to form an emulsion. Recycling of at least a predetermined proportion of the emulsion product through the nozzles as the liquid mixture may be done to reduce the size of the dispersed phase droplets and/or make them more nearly uniform.

According to a further aspect of this invention there is provided a liquid jet interaction chamber block for forming an emulsion, comprising in combination a plurality of nozzles providing elongated orifices arranged to eject under pressure a plurality of sheets of an emulsion-forming liquid system, the nozzles being arranged to effect impingement of the sheets along a common liquid jet interaction front; jet interaction chamber-defining means arranged to provide a zone of the liquid system in which the jet interaction front is formed; inlet channel means to deliver the liquid system under pressure to the nozzles; and discharge channel means to withdraw the liquid in the form of an emulsion from the zone.

According to an additional aspect of this invention, there is provided a liquid jet interaction chamber block for forming an emulsion, comprising in combination base member means having an optically flat surface; top member means having an optically flat surface; shim spacer means interposed between the optically flat surfaces of the base and top member means and maintained in fluid-tight contact with them, the shim spacer means having an opening cut therethrough to expose the optically flat surfaces to each other over a predetermined area; opposed nozzles defined between the exposed surfaces and providing opposed elongated orifices; outer high-pressure liquid inlet channels in fluid communication with the nozzles to provide high-pressure liquid thereto; central liquid jet interaction chamber means between the outlet of the nozzles to provide a low-pressure liquid zone in which a common liquid jet interaction front is formed; inlet liquid conduit means arranged to communicate with the inlet channels; and discharge liquid conduit means arranged to communicate with the central interaction chamber.

According to yet another aspect of this invention there is provided an apparatus for forming an emulsion of an emulsion-forming liquid system, comprising in combination jet interaction chamber block means comprising in combination a plurality of nozzles providing elongated orifices arranged to eject under pressure a plurality of sheets of an emulsion-forming liquid system, the nozzles being arranged to effect impingement of the sheets along a common liquid jet interaction front, and jet interaction chamber defining means arranged to provide a zone of the liquid mixture in which the jet interaction front is formed; liquid supply means arranged to provide predetermined amounts of the liquid system; pump means for delivering the liquid system under pressure to the nozzles; and means to withdraw the liquid system in the form of an emulsion from the zone.

According to a still further aspect of this invention there is provided an emulsion comprised of two immiscible liquids, one of which is dispersed in the other, the emulsion being characterized as essentially free of any emulsifiers.

BRIEF DESCRIPTION OF DRAWINGS

For a fuller understanding of the nature and objects of the invention, reference should be had to the following detailed description taken in connection with the accompanying drawings in which

FIG. 17 is a top plan view of one contacting surface of the shim spacer in which the position of the fluid inlet channels are dotted in;

The method of emulsion formulation of this invention is based upon the bringing about of a turbulent jet interaction along a common interaction front of a plurality of emulsion-forming liquid mixture streams in the form of thin liquid sheets. The liquid sheets are caused to impinge within a low-pressure zone of the emulsion-forming mixture. In a preferred apparatus embodiment, two liquid sheets are forced under pressure to impinge frontally, i.e., at an angle of 180°.

Figure 1:
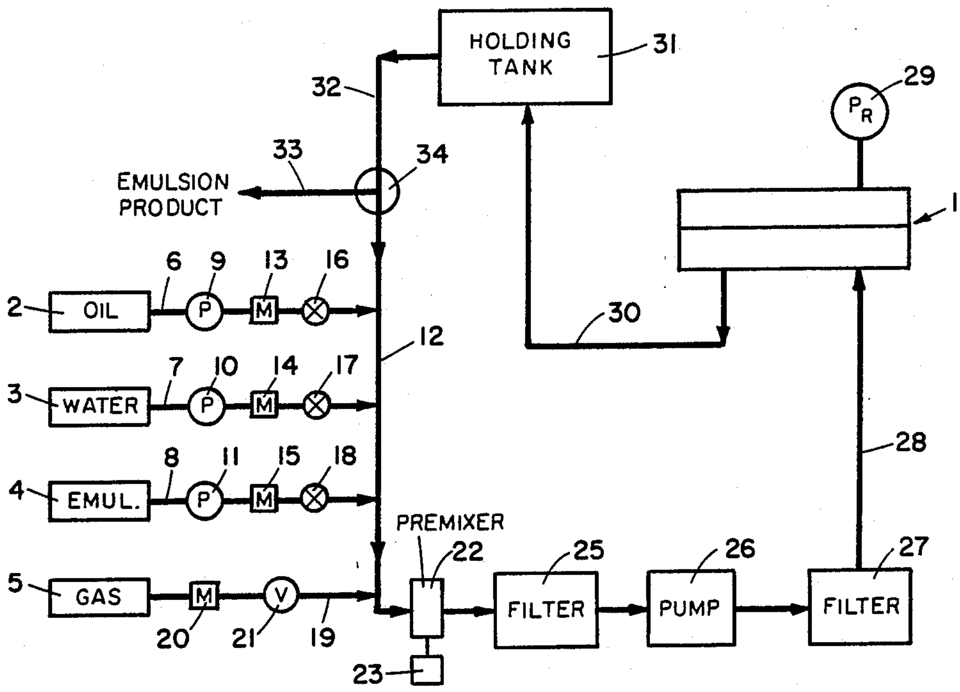
FIG. 1 is a diagram of the emulsion forming system of this invention.

FIG. 1 illustrates an emulsion formulating system comprising the apparatus of this invention. The interaction of the liquid streams takes place in a jet interaction chamber block 1 (FIG. 1). The immiscible liquids, hereinafter for convenience referred to as oil and water, are provided from suitable sources 2 and 3, respectively. If an emulsifier is to be used and if it is not to be premixed with either the oil or water, it is provided from source 4. Finally, for some uses of the apparatus, it may be desirable or necessary to be able to supply a gaseous component. Means for doing this are provided in the form of a gas supply reservoir 5. Each liquid emulsion component is delivered from its respective source 2, 3, or 4 through a line 6, 7 or 8 by an injection pump 9, 10 or 11, respectively. The flow of the components through lines 6, 7 and 8 to the main feed line 12, measured by meters 13, 14 and 15, is controlled by valves 16, 17 or 18, respectively. As an alternative to separately introducing the components into recirculation line 12, they may be premixed and fed into line 12 as a single liquid mixture. In the case of a gaseous component, it is delivered by line 19 through meter 20 and pressure valve 21.

Once the emulsion forming liquids are introduced into line 12, valves 16, 17 and 18 may be shut off, and the resulting liquid mixture is preferably passed through premixer 22 which may have an air/liquid separator 23 associated with it. The premixed liquid is then taken through a preliminary filter 25 which typically is a microfilter capable of removing from the liquid stream any particulate material which the pump 26 can not handle, e.g., material larger than about 140 μm. The pump 26 is preferably one which achieves as near constant displacement with time as possible to maintain the velocity at the nozzles forming the interacting liquid streams as uniform as possible. Exemplary of suitable pumps are those positive-displacement pumps which maintain nearly constant pressure at their inlets, e.g., diaphragm, triplex or gear-driven high pressure pumps. An air-driven pump with a hydraulic intensifier which is capable of delivering a liquid under uniform pressure, except for the very short periods of time when it is changing direction, has been used successfully. Downstream from pump 26 is a second filter 27, typically a microfilter capable of removing from the liquid stream any particulate material the size of which is too great for the nozzles of the jet interaction chamber, e.g., that sized about 5 μm or larger.

The liquid mixture under pressure is then taken through block inlet line 28 into jet interacting chamber block 1, three different embodiments of which are described in detail in conjunction with FIGS. 2–20. The liquid mixture is divided to form the two interacting jet streams in the form of thin liquid sheets. Chamber block 1 is equipped with a pressure gage 29 to permit the monitoring of the pressure of the liquid mixture in the inlet lines leading to the nozzles, i.e., just prior to formation of the interacting jets. The emulsion formed by the jet interaction may then be directed into a holding tank 31 from which it is either recirculated by line 32 through the system or from which product emulsion is withdrawn into line 33 by proper actuation of two-way valve 34. Holding tank 31, which is optional, may be used as a means to control pressures and/or temperatures; or it may be used to maintain a predetermined atmosphere, e.g., of an inert gas, in the system. Its use may also serve as a means to attain a uniform size of the dispersed phase by recirculating the emulsion through the system. Lines 12, 28, 30 and 32 form a recirculation line means in the system. The liquid is recirculated until the desired emulsion is obtained. With the withdrawal of product emulsion, additional measured amounts of oil, water and emulsifier, if used, are added to the stream.

The construction and operation of one embodiment of the jet interaction chamber block 1 are illustrated in detail in FIGS. 2–9. These figures are not drawn to scale in order better to illustrate the shim spacer and its function. Exemplary dimensions and their interrelationship are discussed with reference to FIGS. 8 and 9. As will be seen in FIGS. 2–8, the chamber block 1 of this embodiment comprises a block-forming base member 40, a block-forming top member 41 and a shim spacer member 44. The designation of the two blockforming members as "base" and "top" members is only for convenience, since the jet interaction chamber block may be oriented at any desired angle with regard to the horizon. The two block-forming members 40 and 41 are preferably formed of a stainless steel (e.g., 410 or 440C stainless), and their shimcontacting surfaces 42 and 43, respectively, are ground and lapped to be optically flat. The shim spacer member 44 is preferably cut from a rolled stainless steel film of uniform thickness no less than about 10μm in thickness.

Figure 8:
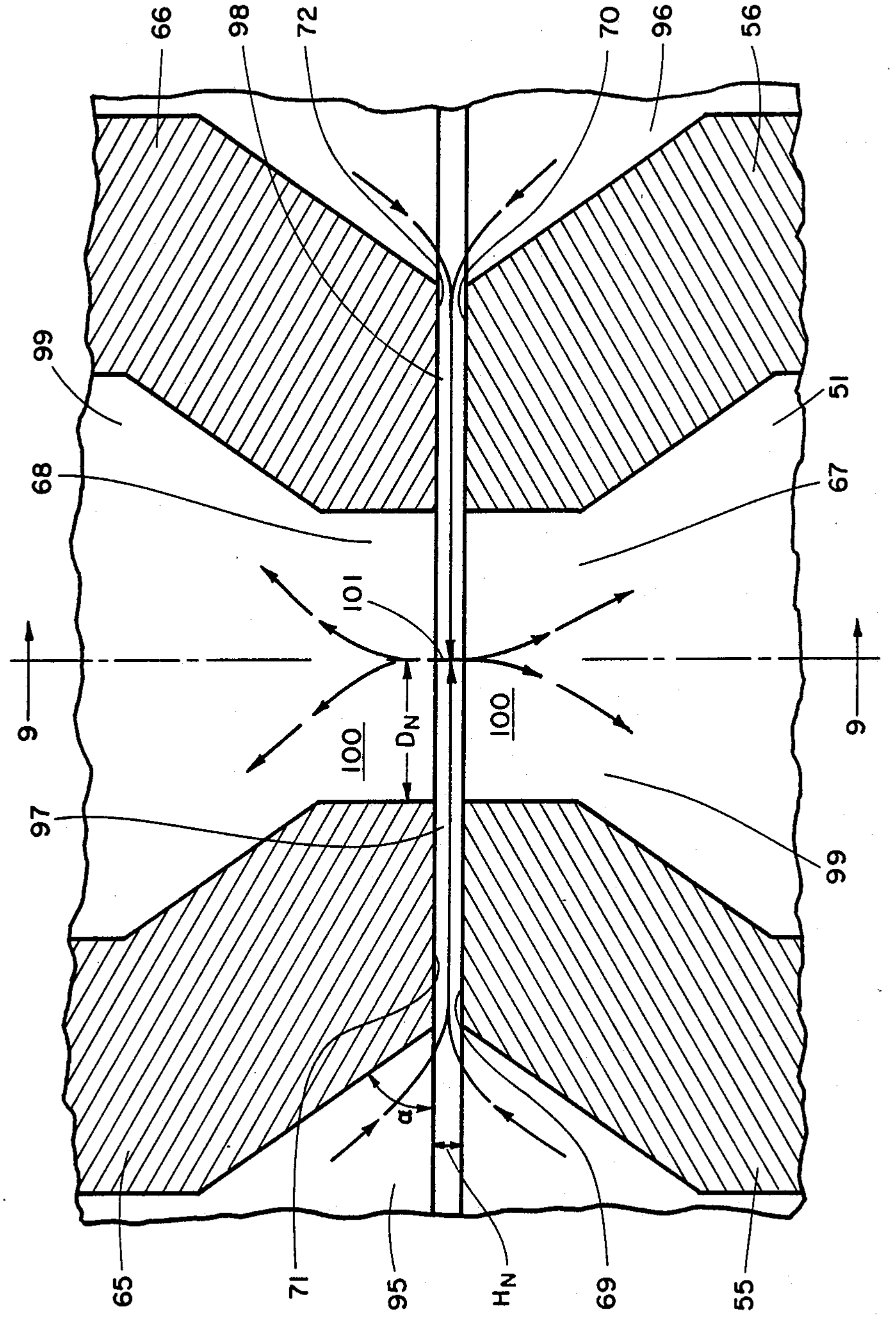
FIG. 8 is a much enlarged portion of the cross section of FIG. 6 showing the area of turbulent jet interaction which gives rise to the formation of the emulsions.

As will be seen from FIGS. 2–8, in which like reference numerals refer to like components, three parallel grooves 50, 51 and 52 are machined in surface 42 of base 40 to extend from and in fluid communication with inlet passage 53 to just short of discharge passage 54. These grooves are separated by groove walls 55 and 56 formed in the machining. In a similar manner, three parallel grooves 60, 61 and 62 precisely aligned with grooves 50, 51 and 52, are machined in surface 43 of top member 41 to extend from in fluid communication with discharge passage 54 to just short of inlet passage 53. Grooves 60, 61 and 62 are separated by groove walls 65 and 66 which are in precise alignment with walls 55 and 56. Between points A and B (FIGS. 2, 4 and 5) walls 55 and 56 and 65 and 66 are swaged inwardly to provide center grooves 51 and 61 with narrow facing passage 67 and 68. Groove walls 55 and 56, and walls 65 and 66 are also thereby modified to provide facing, nozzle forming surfaces 69 and 70, and 71 and 72, respectively, (FIG. 8).

Figure 5:
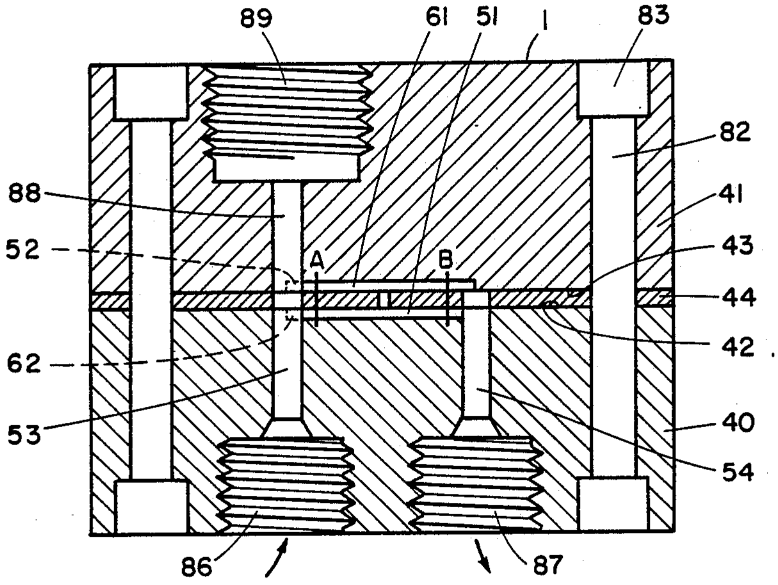
FIG. 5 is a lengthwise cross section of the assembled jet interaction chamber block taken through a plane as indicated by plane 5—5 of FIG. 1.
Figure 2:
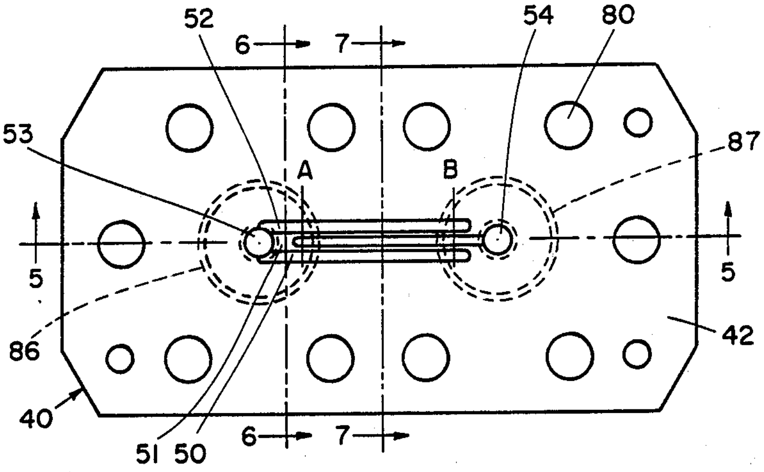
FIGS. 2, 3 and 4 are planar views of the contacting surfaces of the base member, nozzle-defining shim spacer and top member forming one embodiment of the jet interaction chamber block used in making the emulsion.
Figure 3:
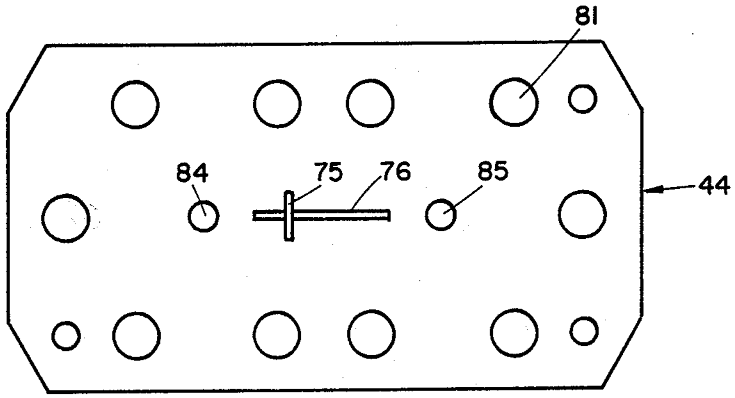
Figure 4:
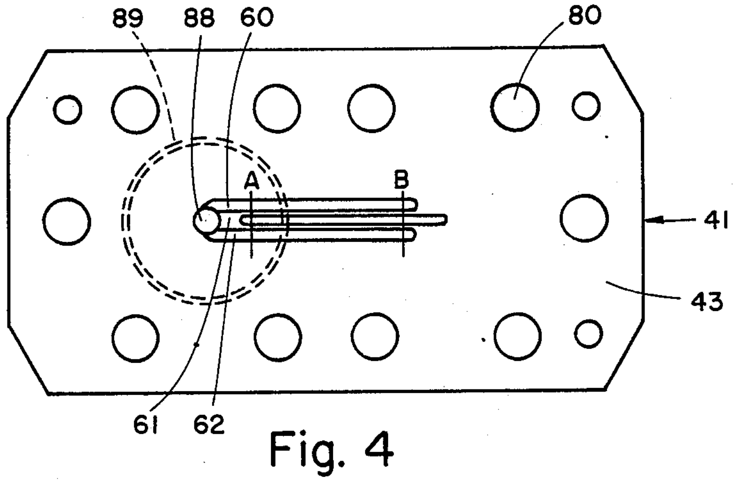
Figure 6:
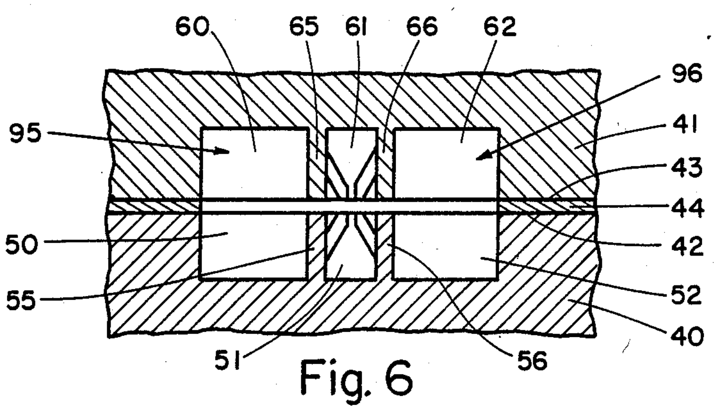
FIG. 6 and 7 are transverse cross sections of the assembled jet interaction chamber block taken through planes 6—6 and 7—7, respectively, of FIG. 2.
Figure 7:
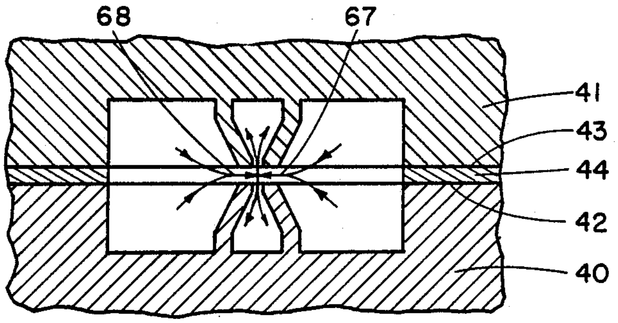

As will be seen from FIG. 3, shim 44 has cut through it, preferably by etching, a transverse slot 75. It is preferable to also cut a slot 76 in shim 44 along the liquid travel line from point A to point B in order to minimize erosion of the shim. Base and top members 40 and 41 have a plurality of aligned holes 80 cut therethrough and corresponding holes 81 are etched through shim 44 to make it possible to assemble jet interaction block 1 (FIG. 5) with appropriate means, e.g., bolts 82 and hexhead cap screws 83. Also cut partially through base member 40 are inlet passage 53 and discharge passage 54, and corresponding holes 84 and 85 are cut through shim 44. As shown in FIG. 5, passages 53 and 54 terminate in threaded wells 86 and 87 adapted for screwing in suitable conduits making up block inlet line 28 and block discharge line 30 (FIG. 1). Finally, top member 41 has cut partially therethrough a passage 88 which terminates in a threaded well 89 adapted for screwing in a line to pressure gage 29 (FIG. 1).

In the assembled jet interaction block as shown in FIGS. 5–8, there are formed parallel liquid inlet channels 95 and 96 which are, in effect, defined by a combination of grooves 50 and 60 and of grooves 52 and 62, respectively. In like manner, central discharge channel 99 is a combination of central grooves 51 and 61; and it has opposed low-pressure turbulent zones 100 comprising passages 67 and 68.

As will be seen from FIG. 8, which is a much enlarged partial cross section of block 1, the facing surfaces 69 and 71 and 70 and 72 of the groove defining walls form two opposing nozzles 97 and 98 communicating between high-pressure inlet channels 95 and 96 and restricted passages 67 and 68. The sheets of liquids ejected from nozzles 97 and 98 interact along a common jet interaction front 101; and the emulsion product of such interaction is directed into the relatively low-pressure zones of turbulence defined within restricted passages 67 and 68 before entering central discharge channels 99 which are in fluid communication with discharge passage 54 (FIG. 5). The jet interaction front 101 is thus submerged in the emulsion-forming liquid. The width, $W_N$, (FIG. 9) of jet interacting liquid sheets ejected from nozzles 97 and 98, i.e., the length of jet interaction front 101, is determined by the length of the transverse passage 75 cut through shim 44 (FIG. 3).

Typical dimensions and operating parameters for the jet interaction block of FIGS. 2–9 may be given as exemplary of the method and apparatus of this invention. The thickness of shim 44, i.e., nozzle height $H_N$, is preferably at least about 10 μm while the width of the interacting liquid sheets, $W_N$, (length of interaction front 101) is controlled only by practical limitations such as the possible distortion of the nozzle surfaces by reason of the high operating pressures. The grooves in the top and base members may be cut to a depth of about 0.1 cm giving channels 95 and 96 an overall height of about 0.2 cm. The combined width of the three in-line grooves, e.g., 50, 51 and 52, for this example is about 0.45 cm with the two outer grooves, and hence channels 95 and 96, having a base width about twice that of central channel 99. The swaging angle α(FIG. 8) may range from about 20° to 40°, and the distance $D_N$ (FIG. 8), between the nozzle discharge ends and the point of liquid sheet impingement is preferably from about 10 to about 20 times the nozzle height. The inlet and discharge passages 53 and 54 are about 0.32 cm in diameter.

The liquid mixture in inlet line 28 (FIG. 1) may be fed into the block at a pressure between about 4,000 and 10,000 psi, depending upon the pump used. Liquid velocity should be at least about 40 meters/second and preferably higher, e.g., up to about 500 meters/second. In this example, using a pump capable of developing up to 10,000 psi pressure, a flow rate between 4 and 10 milliliters/second may be achieved.

Figure 10:
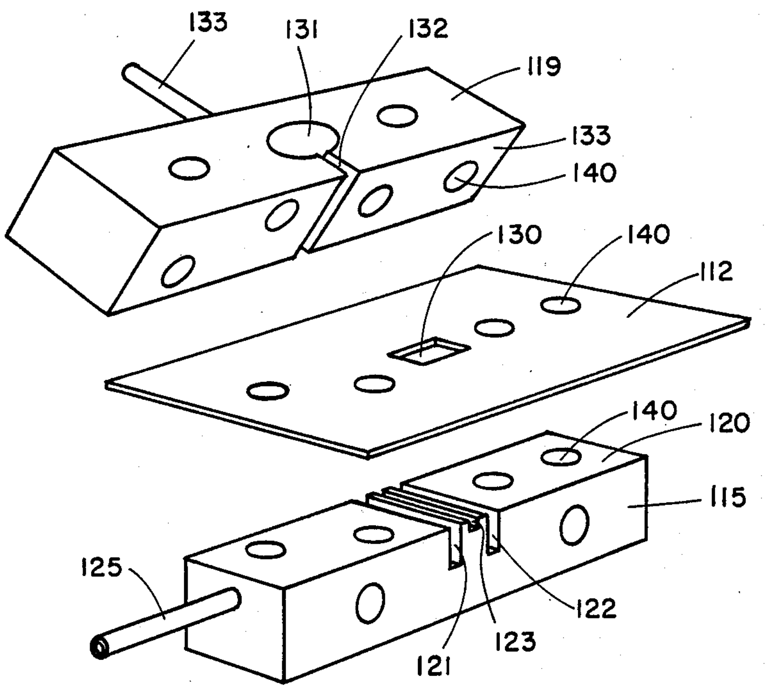
FIG. 10 is a perspective view of the shim spacer and of the central blocks forming a part of the base and top members of a second embodiment of the jet interaction chamber block of this invention.
Figure 11:
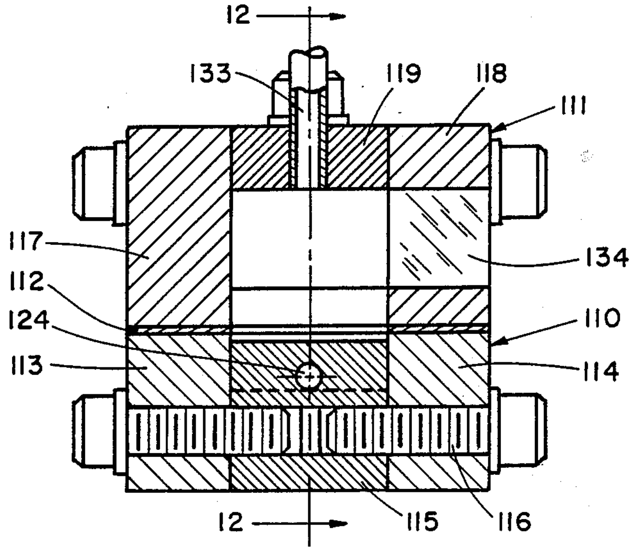
FIG. 11 is a cross section of the assembled second embodiment of the chamber block of FIG. 12 taken through plane 11—11 of FIG. 12.
Figure 12:
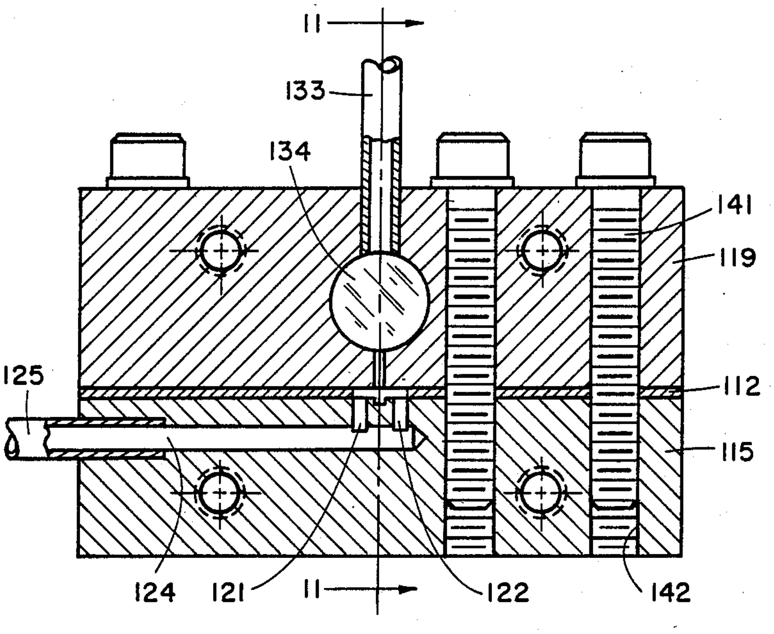
FIG. 12 is a cross section of the assembled chamber block of FIG. 11 taken through plane 12—12 of FIG. 11.

FIGS. 10–13 illustrate another embodiment of the jet interaction chamber block of this invention. These drawings are not to scale, and it will be appreciated that the thickness of the shim spacer is much exaggerated for purposes of illustration. In this embodiment of FIGS. 10–13, the two outer grooves and the center groove defining the liquid inlet channels and central interaction channel are cut in a central block of the base member and the discharge channel is formed in a central block of the top member. FIGS. 10–12 illustrate the components making up the jet interaction block, generally indicated at 1 in FIG. 1, and the manner in which these components are assembled.

As in the case of the embodiments of FIGS. 2–9, that of FIGS. 10–13 is formed as a base member 110 and top member 111 with a shim spacer 112 between. From FIG. 11, it will be seen that base member 110 comprises three sections, outer blocks 113 and 114 and center block 115, which are assembled into a single unit by bolts 116 engaging threads in center block 115. In a similar manner, top member 111 comprises three sections, outer blocks 117 and 118 and center block 119, which are assembled in a single unit in the same manner as shown for the base member. The shim contacting surfaces of the two members are ground and lapped to be optically flat.

Center block 115 of the base member has cut into its shim contacting surface 120 (FIG. 12) two outer, deeper grooves 121 and 122 and a central, shallow groove 123. A fluid passage 124 is drilled into block 115 to provide fluid communication with grooves 121 and 122. This passage is adapted to receive an external fluid conduit 125 which is sealed therein. Conduit 125 thereby provides block inlet line 28 (FIG. 1). As will be seen from FIGS. 10–12, the dimensions, length and width, of shim spacer 112 are the same as the overall contacting surface of the assembled base and top members so that the shim extends throughout the jet interaction block. An opening 130 is cut in shim 112, corresponding in length to the distance between the outside walls of grooves 121 and 122 and having a width equal to the desired width of the interacting jet streams giving rise to the formation of the emulsion. Central block 119 of top member 111 has a fluid chamber 131 cut through it along an axis parallel to that of the central groove 123 of block 115. A fluid discharge passage 132 is cut from the shim contacting surface 133 of block 119 through the block into chamber 131. An externally extending liquid discharge line 133 is inserted through the top of block 119 to communicate with chamber 131 and it serves as discharge line 30 (FIG. 1).

Optionally, outer block 118 of top member 111 may have an optical viewing port 134 in alignment with chamber 131 to make it possible to monitor the quality of the emulsion formed. This port, of course, of a construction which is capable of withstanding the fluid pressures obtaining in chamber 131.

The block sections making up the base and top member 110 and 111 are assembled with shim spacer 112 as shown in cross section in FIG. 12. This is done by drilling an appropriate number of precisely aligned holes through the base and top members and the shim to allow threaded bolts 141 to pass therethrough and engage threads 142 in the holes of the base member. A much enlarged, partial cross section of the fluid interaction portion of the assembled chamber block of the embodiment of FIGS. 10–12 is given in FIG. 13. With the assembly of the block, it will be seen that outer grooves 121 and 122, cut in base member central block 115, define with surface 133 of top member central block 119, two spaced apart liquid inlet channels 150 and 151. Nozzles 152 and 153 are defined by spaced apart surfaces 120 and 133, the height of these nozzles being determined by the thickness of shim 112. The length of jet interaction line 101 is equivalent to the width of opening 130 in shim spacer 112. As far as can be determined, the areas of turbulence lie in central groove 123 and in a small restricted portion of fluid passage 132, adjacent to the outlet of nozzles 152 and 153.

FIGS. 14–20 illustrate a third embodiment of the jet interaction chamber block of this invention. This block is comprised of a central, thick-walled, externally-threaded, annularly configured member 160 defining an internal chamber 161 in which are placed an inlet insert block 162 and a discharge insert block 163 having a shim spacer 164 between them. Insert blocks 162 and 163 are maintained in surface contact with shim 164 by opposing flow couplers 165 and 166 which are internally threaded for connection with external fluid conduits. Thus coupler 165 is connected to liquid inlet line 28 (FIG. 1) and it provides fluid communication by way of a central passage 167 with inlet passage 168 in inlet insert block 162. Similarly, coupler 166 is connected to liquid discharge line 30 (FIG. 1) and it provides fluid communication by way of a central passage 169 with discharge passage 170 in discharge insert block 163. Couplers 165 and 166 are forced and held into engagement with inserts 162 and 163 by clamp nuts 171 and 172, respectively. A dowel pin 173 extending through shim spacer 164 into inserts 162 and 163 ensures proper alignment of the three components; and dowel pins 174 and 175 ensure proper alignment of the flow couplers 165 and 166 with central annular member 160.

Figure 14:
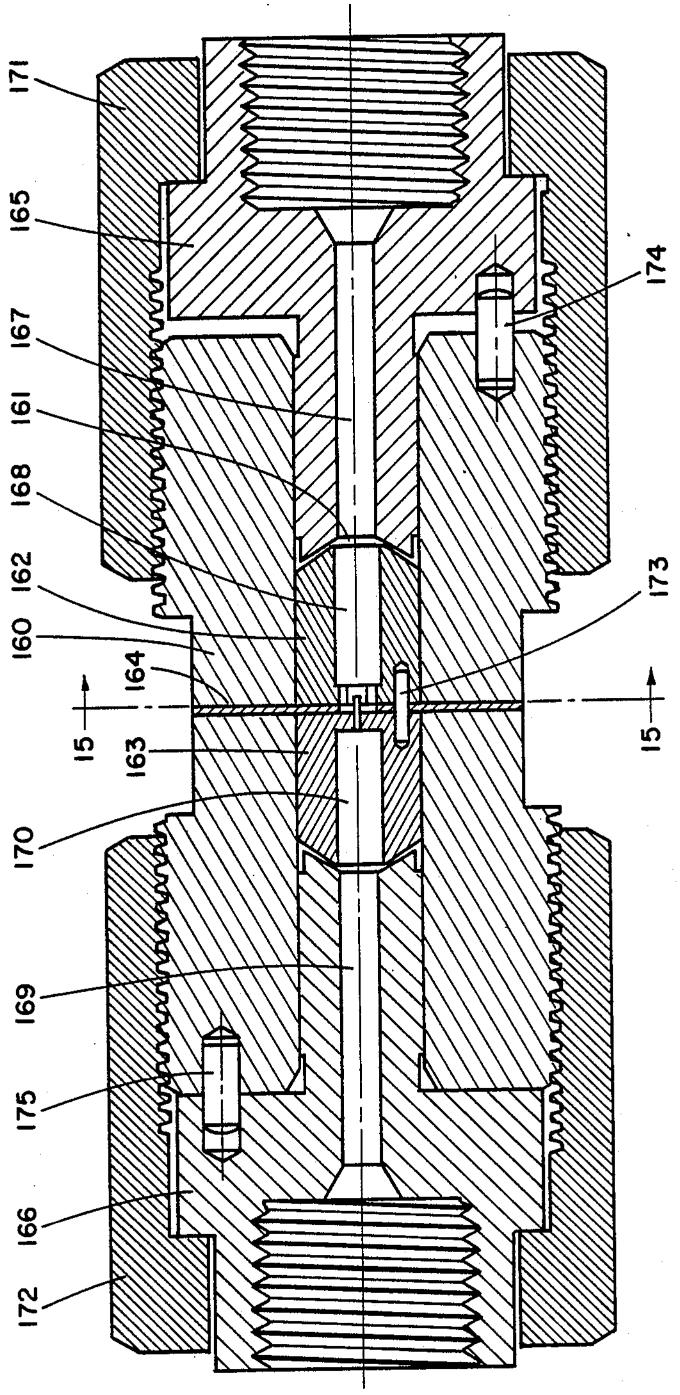
FIG. 14 is a longitudinal cross section of yet another embodiment of the jet interaction chamber block of this invention.
Figure 15:
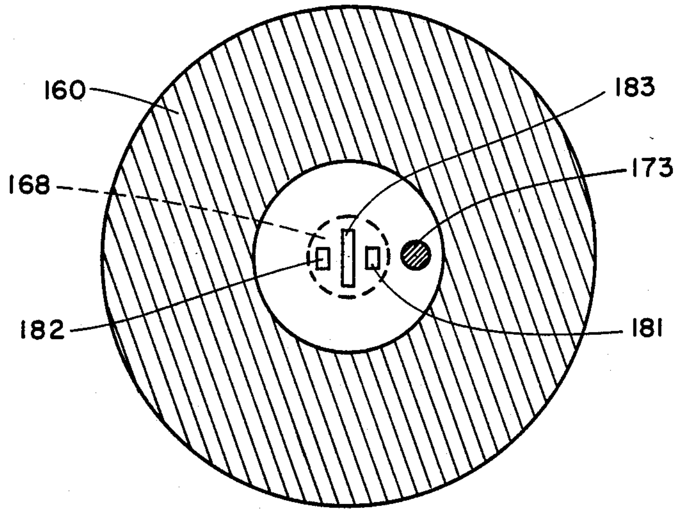
FIG. 15 is a cross section of the chamber block of FIG. 14 taken through plane 15—15 of FIG. 14 showing the shim contacting surface of the inlet insert.
Figure 16:
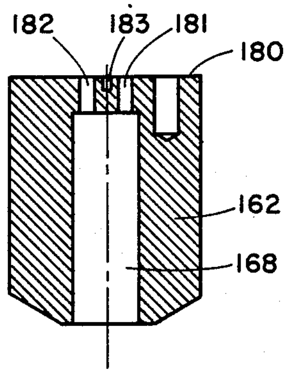
FIG. 16 is a longitudinal cross section of the inlet insert of FIG. 15.

As seen in FIGS. 15 and 16, the shim contacting surface 180 of inlet insert block has cut in it two outer grooves 181 and 182 which extend into inlet passage 168 and a shallow central groove 183. Shim spacer 164, which, as shown in FIG. 14, extends to the edge of the central section of central member 160, has cut through it a cross-shaped opening 185. The length and width of cross arm 186 are chosen to be equal to the length and width of groove 183.

The length of cross arm 187 is equal to the distance between the outer walls of grooves 182 and 183 and its width is determinative of the width of the interacting liquid sheets of liquid.

Figure 19:
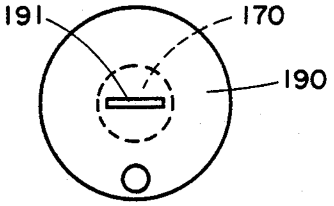
FIG. 19 is a top plan view of the shim contacting surface of the discharge insert.
Figure 17:
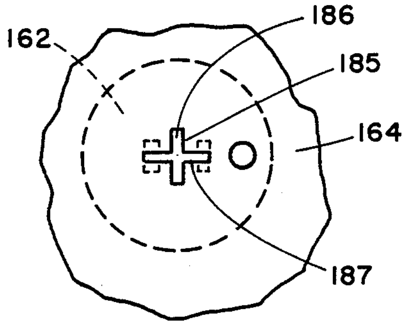
Figure 18:
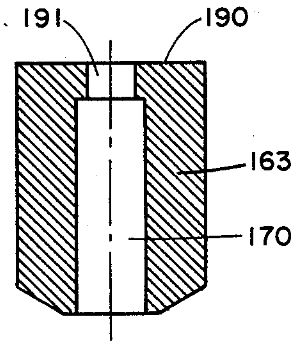
FIG. 18 is a longitudinal cross section of the outlet insert for the block of FIG. 14.

FIG. 18 and 19 detail the construction of liquid discharge insert 163. Into shim contacting surface 190 a slotted passage 191 is cut through to passage 170, passage 191 being in width equal to the width of groove 183 (FIG. 16) and in precise alignment with it. The length of passage 191 is just short of the diameter of discharge passage 170. As in the previously described embodiments, shim contacting surfaces 180 and 190 are ground and lapped to be optically flat.

Figure 9:
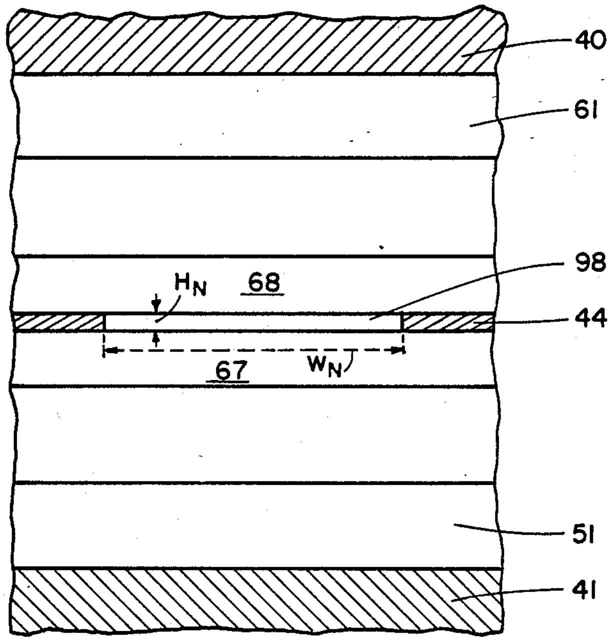
FIG. 9 is a cross section of the area of FIG. 8 taken through plane 9—9 of FIG. 8 and drawn to a smaller scale than FIG. 8.
Figure 13:
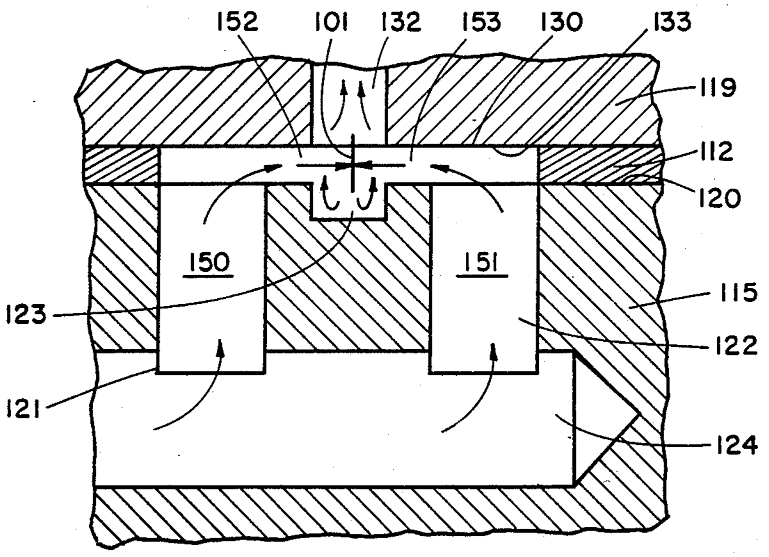
FIG. 13 is a greatly enlarged partial cross sectional view of the liquid inlet and discharge lines, the nozzles, and the turbulent areas of the embodiment of FIGS. 10–12.
Figure 20:
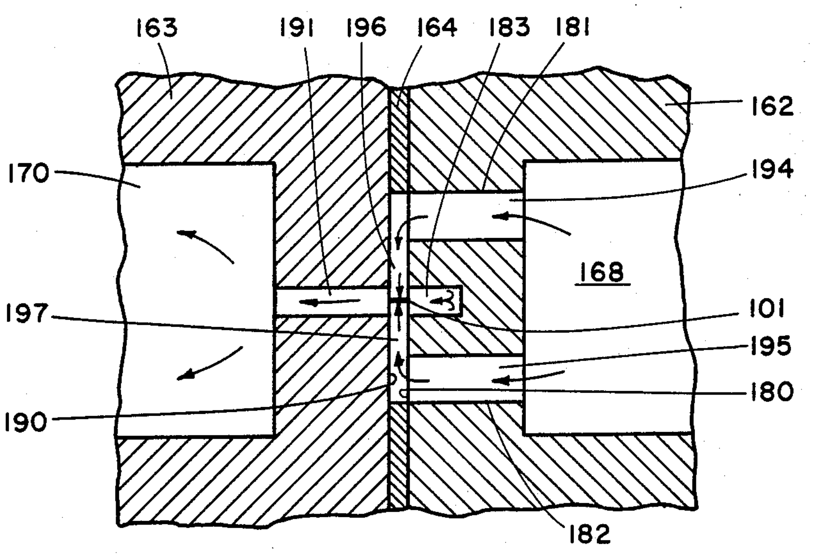
FIG. 20 is a greatly enlarged partial cross sectional view of the liquid inlet and discharge inserts, the nozzles, and the turbulent areas of the embodiment of FIGS. 14–19.

A comparison of FIGS. 13 and 20 shows that the mechanism of emulsion formation is the same in the embodiments of FIGS. 10–13 and FIGS. 14–20 as in the embodiment of FIGS. 2–8, particularly as detailed in FIGS. 8 and 9. In FIG. 20, the liquid mixture forming the emulsion is introduced under pressure from central passage 168 into outer channels 194 and 195 defined by outer grooves 181 and 182 and contacting surface 190 of discharge insert 163. Likewise, nozzles 196 and 197 are defined between surfaces 180 and 190, the height of these nozzles being determined by the thickness of shim spacer 164. The width of liquid stream interaction front 101 is the width of cross arm 187; and the areas of turbulence are apparently in central groove 183 and in that portion of slotted groove 191 adjacent the common interaction front 101. The ranges of the various dimensions, e.g., shim thickness (nozzle height $H_N$); width of interacting liquid sheets $W_N$, nozzle spacing, $D_N$, as well as the operational parameters, e.g., fluid pressure, flow rate, flow velocity and the like are the same for the embodiments detailed in FIGS. 13 and 20 as for that of FIGS. 8 and 9.

Figure 21:
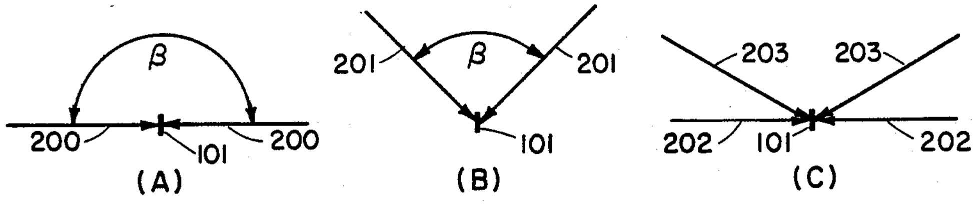
FIG. 21 illustrates diagrammatically the range of liquid mixture impingement angles and the use of more than two impinging liquid mixture sheets to form the emulsion of this invention.

In the above-described apparatus embodiments the two sheets of the liquid emulsion-forming mixtures are positioned relative to each other to effect the direct frontal impingement of the sheets. Thus as illustrated in FIG. 21A, the angle of impingement, $\beta$, of the two liquid sheets represented by arrows 200 is 180° to achieve such frontal impingement. It is, however, within the scope of this invention to use impingement angles no less than about 90° as illustrated in FIG. 21B by arrows 201 representing liquid sheets impinging at that angle. It is also possible to employ more than two liquid sheets so long as they impinge along a common liquid jet interaction front 101. This is shown in FIG. 21C wherein four liquid sheets, represented by two pairs of arrows 202 and 203, are used.

Figure 22:
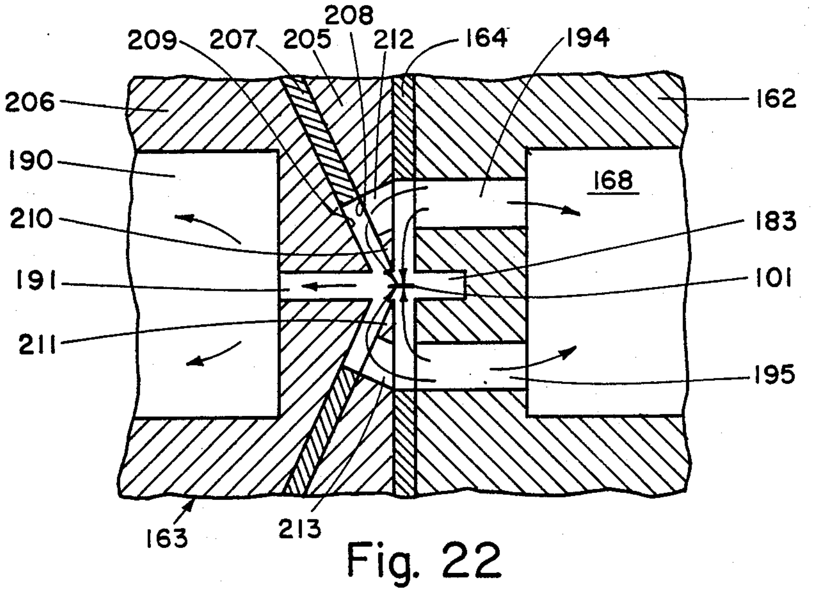
FIG. 22 is a partial cross section of a jet interaction chamber block arranged to provide four interacting liquid streams under pressure.

FIG. 22 is a partial cross section of a modification of the apparatus embodiment of FIGS. 14–20 illustrating how more than two interacting liquid sheets may be used. This requires additional nozzles, and in FIG. 22 these are provided by forming discharge insert block 163 as two separate components, i.e., an inlet component 205 having a wedge-shaped cross section and a discharge component 206 complementary in configuration to inlet component 205 so that when shim spacer 207 is placed between their facing surfaces 208 and 209 a second set of nozzles 210 and 211 is provided. Fluid passages 212 and 213 are cut through inlet component 205 to communicate with high pressure inlet channels 194 and 195 to make the incoming liquid mixture available to nozzles 210 and 211.

Figure 23:
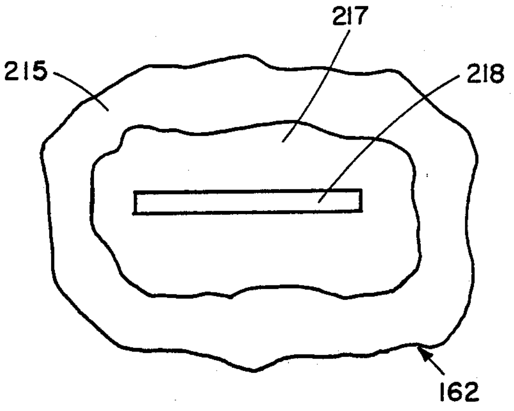
FIG. 23 is a fragmentary top planar view showing the formation in the contacting surface of a base member of a shallow channel used in place of a shim spacer to form the opposing nozzles.
Figure 24:
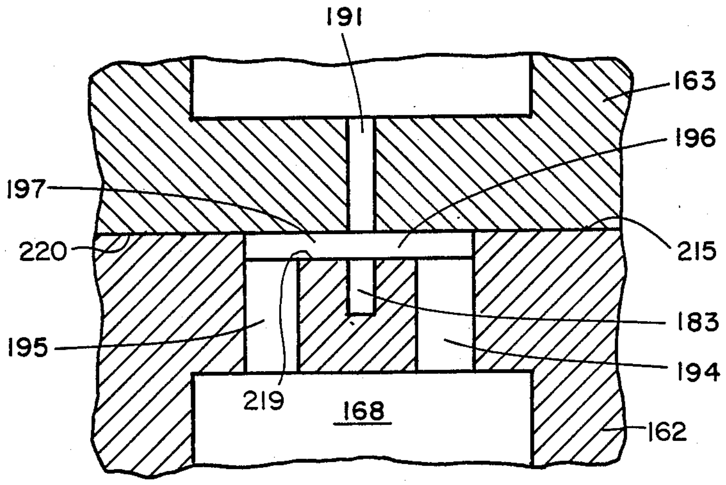
FIG. 24 is a partial cross section of a jet interaction block formed with the base member of FIG. 23.

It is also within the scope of this invention to construction the jet interaction block without the shim spacer as illustrated in FIGS. 23 and 24 which are directed to a modification of the embodiment of FIGS. 14–20. Inlet insert block 162 is formed as previously described to have an optically flat surface 215 into which is etched a channel by the steps which include coating surface 215 with a resist 217, exposing it through a mask (not shown) and developing to leave an area 218 unexposed, and etching the surface over area 218 to attain the desired depth of channel 219 (FIG. 24) so that when surface 215 is maintained in direct contact with optically flat surface 220 of discharge insert block 163, nozzles 196 and 197 will be formed to function as hereinbefore described.

A number of emulsions, including microemulsions, were formed using either the apparatus embodiment of FIGS. 10–13 or of FIGS. 14–20. The liquids used in forming these emulsions were generally premixed and the pump was a one-half horsepower, air-driven pump with a hydraulic intensifier. Unless otherwise indicated, the liquid flow velocity was maintained at about 100 meters/second, the liquid flow rate at about 60 milliliter/minute, and the pressure in the range of between about 7000 and 8000 psi. It was found that variation in pressure had little or no effect on the characteristics of the emulsions obtained. However, both liquid flow velocity and processing time (number of passes through the system) may be used to control the size and uniformity of the dispersed phase droplets. The following examples, which are meant to be illustrative and not limiting are given further to describe the invention.

EXAMPLE 1

Phosphatidyl choline was first processed through the system to give a clear solution with a particle size (diameter) of about 0.08 μm (800A). From the information obtained from processing this material it became possible to conclude that any emulsions formed which were clear materials had dispersed phase droplets below about 0.10 μm, i.e., were microemulsions.

EXAMPLE 2

Commercially available soy phosphatides (95% purified) were dissolved in water and used as the water phase to form oil-in-water emulsions with sesame oil and mineral oil. The ratio of continuous phase to dispersed phase was varied from 6 to 1 to 1 to 2. The resulting emulsions formed in using the apparatus of FIGS. 10–13 were all of a milky appearance indicating that the oil droplets were up to about one μm in size. None of the emulsions experienced settling either before or after being centrifuged and all remained stable over an extended period of time. Inasmuch as the phosphatides contain lecithin, a natural emulsifier, these emulsions can be considered to have been made with an emulsifying agent.

An emulsion was made, in the apparatus of FIGS. 14–20, of rose oil in phosphatidyl choline using a weight ratio of 4 to 1. The processing of the premixed material was carried out for 10 minutes at 7500 psi and at a flow rate of 60 ml/minute at 60° C. The particle size of the dispersed phase of the resulting emulsion was measured using an ICOMP laser light-scattering particle-size analyzer Model HN-5-90. By this technique the particle size was found to be about 0.15 μm.

EXAMPLE 3

A series of oil-in-water emulsions was formed in the apparatus of FIGS. 14–20 using phosphatidyl choline as the continuous water phase and glyceryl trioleate (olein) as the discontinuous oil phase. The weight ratio of continuous to discontinuous phase was varied between 1 to 1 and 8 to 1. All of the emulsions formed remained completely stable over an extended period. The emulsion made from the 1 to 1 ratio mixture had dispersed particles sized about 0.2 μm. Substitution of cholesteryl oleate for the glyceryl trioleate gave essentially the same results.

EXAMPLE 4

2.5 grams of phosphatides were dissolved in 40 ml distilled water and then the solution was mixed with 2.5 grams of mineral oil. To this liquid mixture was added 6.9 grams of aluminum chlorohydrate as a source of metal ions which are known to destabilize microemulsions. The premixed liquid separated into two phases soon after mixing. Processing of the premixed liquid for 5 minutes at 6500 psi in the apparatus of FIGS. 10–13 provided a stable emulsion which, when centrifuged at about 100 g's exhibited only some slight separation. However, the aluminum ions did not break the emulsion formed. When an identical premixed water/oil aluminum chlorohydrate liquid was sonicated by prior art techniques, it was not possible to fully disperse the oil.

EXAMPLE 5

An emulsion of menthol and water was made by adding 2.5 grams solid menthol to 50 ml of distilled water and then heating the mixture until the menthol melted and floated on top as an oil layer. The hot mixture was processed for 5 to 6 minutes under 6000 psi to give a milky white emulsion. When the emulsion was stored in a glass bottle which was approximately half full, some crystals of menthol were observed to be adhered to the inside bottle wall and to the emulsion surface. This formation of menthol crystals was attributable to the high vapor pressure of menthol in the incompletely filled bottle. However, the emulsion remaining in the bottle was uniform and stable.

EXAMPLE 6

Various water/oil mixtures containing no emulsifying agents and using a commercial vegetable oil (Wesson ®) in a 6 to 1 weight ratio, mineral oil in 4 to 1 and 5 to 1 weight ratios, and silicone oil in a 9 to 1 weight ratio, were made up and processed to form emulsions in the apparatus of FIGS. 10–13 and of FIGS. 14–20. In all cases, emulsions were formed which remained stable for several hours. However, after about 24 hours it was noted that a quasi-stable emulsion had developed characterized as consisting of three layers, the middle of which made up the bulk of the liquid and remained as a stable system. On several occasions, the quasi-stable emulsions have appeared to be uniform and stable over an extended period of time, some as long as several months. These oil-in-water emulsions can be made stable by shaking into them very small amounts of a suitable emulsifying agent after they are formed and before any separation takes place. The fact that true emulsions can be formed without emulsifying agents presents the possibility of incorporating the apparatus of this invention in a fuel delivery system to emulsify water, alcohol or other supplemental fuels with fuel oil immediately before delivery to the burner.

EXAMPLE 7

The use of small amounts of an emulsifier and a stabilizer and the effects of pumping pressure, flow rate and pumping time are illustrated in this example. 100 parts (all by weight) of paraffin oil, 9.75 of oleic acid dissolved in the oil, 885 of water and 5.25 of triethanolamine dissolved in the water were premixed to give a feed material in which the particle size was 3.1 μm. A single pass of the mixture through the apparatus of FIGS. 14–20, at 4000 psi and a flow rate of 48 ml/minute produced an emulsion in which the dispersed phase droplets were about 0.25 μm in diameter and when the pressure was increased to 7500 psi and the flow rate to 60 ml/minute, the size of the droplets was about 0.24μm. Processing of this feed mixture for about 15 minutes at 7500 psi and a flow rate of 60 ml/minute gave dispersed phase droplets of about 0.2μm in diameter.

EXAMPLE 8

A milky white emulsion was formed by mixing 20 ml of styrene monomer with 30 ml of distilled water and processing the liquid mixture in the apparatus of FIGS. 10–13 at 7000 psi for 4 minutes and then at 6200 psi for an additional four minutes. A 100-ml, three-neck, round bottom flask equipped with an overhead air-driven stirrer, condenser, and nitrogen-inlet, was flushed with nitrogen for about one-half hour and set up in a water bath. When the bath temperature reached 40° C., the emulsion, 2–3 ml of water and 0.2 gram butyl peroxide catalyst were added. The water bath temperature was maintained at 65° C. and the air-pressure operating the stirrer was held at about 2.5 psig overnight. The monomer was found to be polymerized into an agglomerated material which was friable and easily broken up into a fine powder. Thus there was produced a unique form of polystyrene which did not contain any extraneous emulsifier.

EXAMPLE 9

Whole milk was processed in the apparatus of FIGS. 14–20 for about two minutes at a pressure of about 7100 psi and a flow rate of about 60 ml/minute. The resulting homogenized milk was stored in a refrigerator for two days along with a sample of the same whole milk which had not been processed. The homogenized milk exhibited no creaming; but the unprocessed, unhomogenized sample had creamed.

From the above description and examples it will be seen that there is provided a unique method and apparatus for forming emulsions, including microemulsions. The uniqueness of the method and apparatus is in part evident from the fact that emulsions may be formed with little or no emulsifying agents, thus providing a novel form of emulsions. The method and apparatus of this invention open up new avenues of development, among which are emulsion polymerization without the need to remove emulsifying agents, the controlled rupturing of cells, homogenization of milk, the addition of such supplemental fuels as ethanol to Diesel oil, water and finely divided coal to fuel oil, and the like, and the formation of emulsions heretofore considered either impractical or even impossible to form.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

We claim:

1. A method of forming a microemulsion, said method comprising the steps of:

- forming a mixture of liquids so as to produce a microemulsion-forming liquid system;
- dividing said mixture into at least two mixture streams;
- pressurizing each of said streams to a pressure of at least 4000 psi;
- ejecting each of said pressurized streams through a corresponding nozzle, at a velocity of at least 40 meters/second, into a low-pressure zone filled with said mixture so that said streams impinge upon one another in said low pressure zone so as to (a) create a turbulent jet interaction of said streams along a common boundary essentially defined and formed by said mixture in said low pressure zone and by said streams ejected into said zone, and (b) form said microemulsion so that said microemulsion includes disperse phase droplets having a diameter no greater than about 1 μm; and
- removing said formed microemulsion from said low pressure zone.

2. A method in accordance with claim 1, further including the step of recycling a predetermined portion of said microemulsion through each of said nozzles under said pressure and at said velocity.

3. A method in accordance with claim 1, wherein said step of ejecting each of said streams includes the step of ejecting said streams through corresponding elongated nozzles having a height dimension on the order of 10 μm.

4. A method in accordance with claim 3, wherein said step of ejecting each of said streams includes the step of ejecting said streams through corresponding elongated nozzles having a width dimension ranging from about ten to twenty times said height dimension.

5. A method in accordance with claim 1, wherein said step of dividing said mixture includes the step of dividing said mixture into two streams, and said step of ejecting said streams includes the step of ejecting said two streams at a relative impingement angle to one another so that said angle of impingement in said zone is between 90° and 180°.

6. A method in accordance with claim 5, wherein said step of ejecting said two streams includes the step of ejecting said two streams at an angle of impingement of 180° so that said streams impinge frontally to create said turbulent jet interaction.

7. A method in accordance with claim 1, further including the step of adding an emulsifier to said mixture.

8. A method in accordance with claim 1, further including the step of adding an emulsifier to said microemulsion following said removing step.

9. A method in accordance with claim 1, further including the step of adding finely divided particulate material to said mixture.

10. A method in accordance with claim 9, wherein said step of forming said liquid mixture includes the step of mixing oil and water, and said step of adding finely divided particulate material includes the step of adding finely divided particles of coal to said mixture.

11. A method in accordance with claim 1, wherein said step of forming said liquid mixture includes the step of mixing oil and water.

12. A method in accordance with claim 1, wherein said step of forming said liquid mixture includes the step of adding a polymerizable monomer.

13. A method in accordance with claim 1, wherein said step of pressurizing each of said streams includes the step of pressurizing said stream at a pressure between about 4000 psi and 10,000 psi.

14. A method in accordance with claim 1, wherein said step of ejecting each of said streams includes the step of ejecting said stream at a liquid velocity between about 40 meters/second and 500 meters/second.

* * * * *